Jan. 2, 1951  F. P. DE SOUSA  2,536,629
ANGLE BLOCK
Filed Sept. 28, 1945

INVENTOR
Frank P. DeSousa

Patented Jan. 2, 1951

2,536,629

UNITED STATES PATENT OFFICE 2,536,629

ANGLE BLOCK

Frank P. De Sousa, Chicago, Ill.

Application September 28, 1945, Serial No. 619,141

1 Claim. (Cl. 33—174)

This invention relates to a universal angle block on which the above class of work is mounted and lined up for construction or inspection, but at the same time it can be used as a sine bar or sine plate without adding anything to, or removing anything from, or readjusting it in any way.

In addition to the above, the construction of this universal angle block permits it to be tilted upward from the base at either end when being used as a sine bar or sine plate.

The objects are first; to promote extreme accuracy in shop mechanics, second; full convenience for the mechanic, third; to introduce a device which when used as a sine plate, may be tilted upward from the base at either end, and fourth, to save valuable time and expense in precision and tool manufacturing, which of course will be the result of the three above mentioned objects combined.

With the fore-going and other objects and advantages in view, the invention consists of the novel details of construction, arrangement and combination of parts more fully here-in-after described, claimed and illustrated in the accompanying drawings in which;

Figure 3:
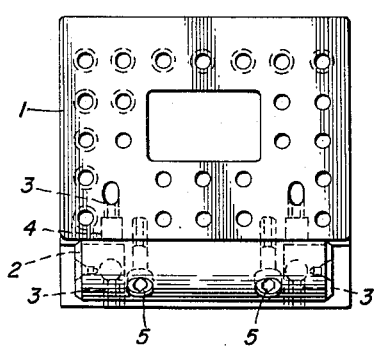

Fig. 3 an end view.

Numerous holes for mounting the work on the universal angle block are drilled and tapped in convenient locations on the top, front, rear and both ends of block 1, as shown in all views. A rectangular opening shown at the center of block 1 in Fig. 3, is optional, and may run the length of block 1 and serve only in weight reduction.

Figure 1:
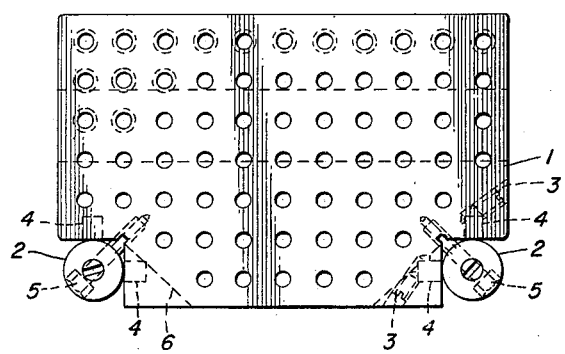
Fig. 1 is a front view of the assembled invention.
Figure 2:
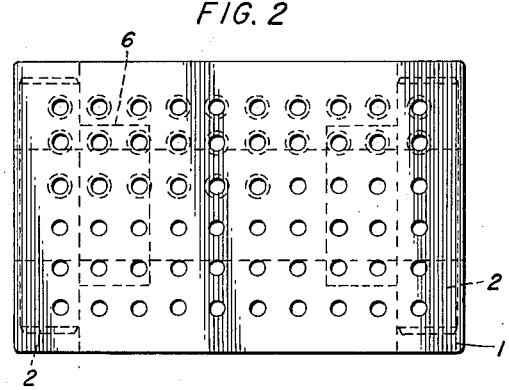
Fig. 2 is a top view.

For angle construction or checking purposes, square shoulder recesses are cut out on block 1 to accommodate sine rolls 2 as shown in Fig. 1. These recesses are made to a depth that will allow rolls 2 to clear the end surfaces of the block 1 by approximately .015 inch, and the bottom surface of block 1 by exactly .003 inch, when rolls 2 are properly adjusted. Adjustment of rolls 2 is accomplished by the method shown in Fig. 1, in which locating pins 4 are adjusted in position by cone point set screws 3, and rolls 2 locked securely against locating pins 4 by means of socket head screws 5, pins 4 and screws 3 being disposed in holes in block 1 adjacent recesses 6.

As will be seen, this method of adjustment insures positive accuracy in the manufacture of this invention where-by;

The center distance between rolls 2, their parallel condition, and their matched .003 inch clearance from the bottom surface of the block 1, may all be adjusted positively exact at the final assembly of the universal angle block. Likewise, should wear or abuse render it necessary, this method of adjustment also permits convenient and accurate periodical readjustment of rolls 2.

The two angular clearances 6, cut away from both recesses on the bottom of block 1, are to accommodate precision gage blocks and permit the universal angle block to be tilted upward from the base at either end, when being used as a sine bar or sine plate in the construction or inspection of angular work.

As previously stated, although both rolls 2 clear the bottom surface of the block 1 by exactly .003 inch, it will be seen that slightly tilting the universal angle block upward at either end from the base, will cause the roll 2 on the opposite end to immediately contact the base surface, the universal angle block there-by becoming an extremely accurate sine plate. The purpose of the .003 inch clearance between the rolls 2 and the base surface of the block 1, is to eliminate the possibility of any wear or damage on the rolls 2 when the universal angle block is not being used as a sine bar or sine plate.

All surfaces of the block 1 are ground and lapped parallel, square and otherwise true with each other as applicable.

Extreme accuracy may always be attained when using this universal angle block not only because of the novel method of adjustment of rolls 2, but also because of the fact that once the work is properly mounted and lined up as desired on this universal angle block, introduction of any additional surface contacts, such as lifting it and placing it on a sine plate, is unnecessary, as the universal angle block itself automatically becomes a sine plate when tilted as here-in-before explained. Further, the elimination of unnecessary surface contacts removes annoyances which are likely to be caused by burrs, dirt, grit and the like.

I claim:

A rectangular block, having a base surface and tapped holes conveniently located on the other five surfaces for mounting and lining up work, transverse rolls securely fastened in notches formed as dihedral angles along the transverse ends of the base surface of said block, adjustable supports for said rolls consisting of small right cylindrical members and cone point set screws said rolls not secured directly to, or against, said block but drawn tightly against one end of the small right cylindrical sliding members disposed in, and at right angles to both surfaces of the dihedral angles forming said notches in said block, said small cylindrical sliding members being actuated, or adjusted by cone point set screws disposed, and positioned diagonally in said block so as to angularly contact the other end surfaces of said small right cylindrical sliding members, while affecting such adjustment.

FRANK P. DE SOUSA.

REFERENCES CITED

The following references are of record in the file of this patent:

UNITED STATES PATENTS

| Number | Name | Date |
| --- | --- | --- |
| 2,111,299 | Robbins | Mar. 15, 1938 |
| 2,325,904 | Brebeck | Aug. 3, 1943 |
| 2,347,111 | Jesionowski | Apr. 18, 1944 |
| 2,378,743 | Wisne | June 19, 1945 |
| 2,390,865 | Bemis | Dec. 11, 1945 |